Sept. 22, 1931. L. E. LA BRIE 1,824,052
BRAKE
Filed June 27, 1927
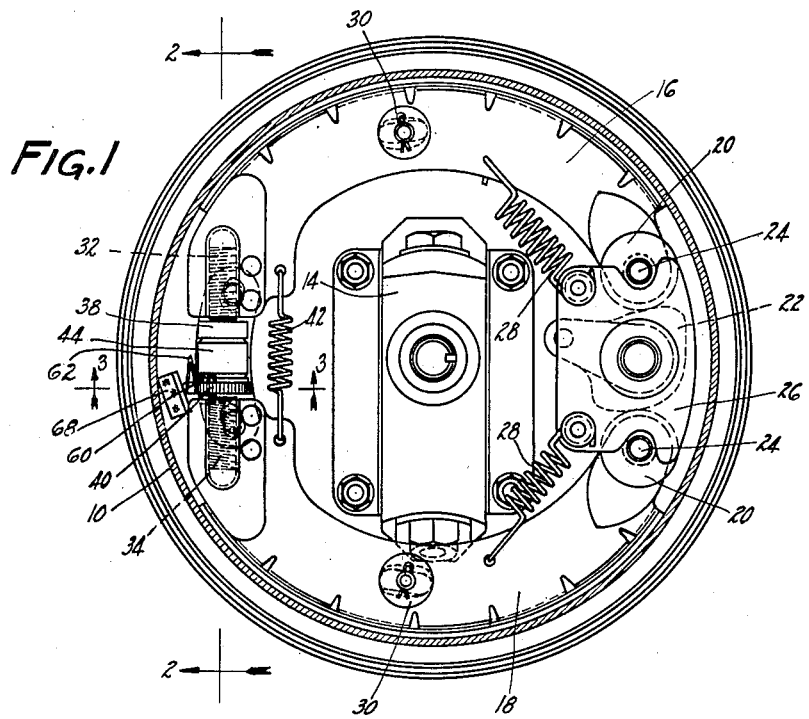
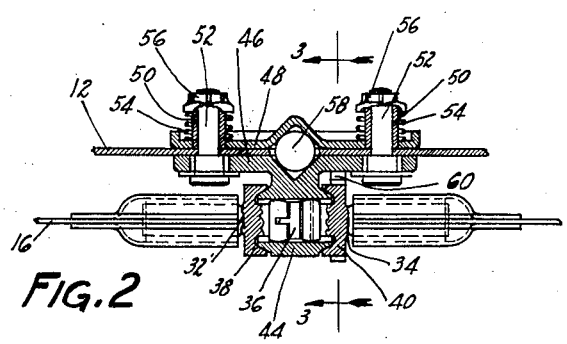
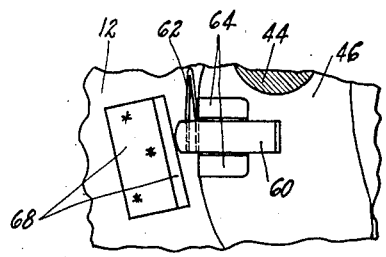
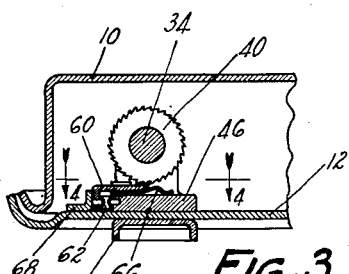
INVENTOR
LUDGER L. LA BRIE
BY
Jn. W. McConkey
ATTORNEY Patented Sept. 22, 1931

1,824,052

UNITED STATES PATENT OFFICE

LUDGER E. LA BRIE, OF SOUTH BEND, INDIANA, ASSIGNOR TO BENDIX BRAKE COMPANY, OF SOUTH BEND, INDIANA, A CORPORATION OF ILLINOIS

BRAKE

Application filed June 27, 1927. Serial No. 201,894.

This invention relates to brakes, and is illustrated as embodied in an internal expanding automobile brake.

A very important feature of the invention relates to adjusting the brake automatically to compensate for wear, by increasing the effective length of the friction device, for example by automatically moving forward a thrust member threaded in or otherwise mounted on the end of the shoe or its equivalent.

This is especially desirable in a brake of the type having a floating friction device shifting its anchorage according to the direction of rotation of the brake drum, and in this case I prefer to make the adjustment by varying a novel connection between the shoes or other parts of the friction device, as this retains the anchorages and the applying means unaltered throughout the life of the brake lining.

I also consider it desirable to combine with the adjusting means a novel centering device which automatically returns the friction means to the proper idle position when the brake is released.

The adjusting means, the connecting means, and the centering means each embodies features of novelty in its own construction, as well as in combination. These and other features, including various novel and desirable structural details, will be apparent from the following description of one illustrative embodiment of the invention shown in the accompanying drawings, in which:

Figure 1 is a vertical section through the brake, just inside the head of the brake drum, and showing the brake shoes in side elevation;

Figure 2 is a partial section on the line 2—2 of Figure 1, showing the centering and connecting means;

Figure 3 is a partial section on the line 3—3 of Figure 1, showing the automatic operation of the adjusting means; and Figure 4 is a partial section on the line 4—4 of Figure 3, showing the mounting of the pawl of the adjusting means.

The brake selected for illustration includes a rotatable drum 10, at the open side of which is arranged a backing plate or other support 12, illustrated as carried by a front wheel knuckle 14. Within the drum 10 is shown the friction means of the brake, preferably in the form of a floating friction device which may include interchangeable connected shoes 16 and 18.

At their right ends (Figure 1) shoes 16 and 18 may be provided with thrust rollers 20 engaged by floating brake-applying cams 22, and having spindles 24 projecting laterally into notches in the edges of stationary plates 26 serving as anchorages for the brake. When the drum is turning clockwise, spindle 24 of shoe 16 seats in its anchorage notches, while when the drum is turning counter-clockwise, the spindle 24 of shoe 18 seats in its anchorage notches.

The brake is applied against the resistance of return springs 28, and may, if desired, be provided with suitable steady rests 30.

According to one feature of the present invention, shoes 16 and 18 are connected by novel thrust members 32 and 34 arranged end to end and threaded (with right and left threads) into the ends of the shoes 16 and 18 respectively. Members 32 and 34 are interconnected at their adjacent ends, to turn together, by means such as an Oldham coupling 36,—i. e. by a device having tongues or keys at right angles to each other and seated in corresponding notches or keyways in the ends of members 32 and 34. This coupling causes members 32 and 34 to turn together even if they are not exactly in alinement with each other.

Members 32 and 34 preferably have flanges 38 and 40 formed with partial spherical lateral surfaces urged by a spring 42 against opposite sides of an outwardly spherical thrust-transmitting part 44 having an internal transverse opening inclosing the coupling 36.

Part 44 has a laterally-extending portion 46 at one side of the brake shoes and slidably engaging the inside of the backing plate 12. There is a corresponding part or member 48, shown stamped from sheet metal, on the outside of the backing plate. Member 48 is formed with openings having a sliding fit over bushings 50 sleeved on studs 52 carried by the backing plate and having collars inside the backing plate arranged in slots in opposite ends of portion 46 of member 44.

Spaced springs 54 sleeved on bushings 50 are compressed between member 48 and nuts 56 threaded on the ends of studs 52 against the ends of bushings 50.

The parts just described comprise a novel centering device resisting movement of the connection between the shoes, in either direction, and returning the shoes to the proper idle position when the brake is released. This device is operated by a member or spreader, such as a roller or anti-friction ball 58 received in registering double-wedge recesses formed in members 44—46 and 48. Whichever direction the friction means shifts when the brake is applied, portion 46 of member 44 slides along the backing plate, against which it is held by studs 52, thus forcing member 48 outwardly through the medium of the spreader or roller 58 and compressing the springs 54.

It will be seen that turning the thrust members 32 and 34 serves to increase the effective length of the brake friction means; in fact, it serves to increase the effective length of both of the shoes 16 and 18. This serves to adjust the brakes to compensate for wear, without disturbing the anchorages or the applying means.

According to another and very important feature of the present invention, advantage is taken of this arrangement to include in the brake automatically-operated means for making this adjustment. To this end, flange 40 of member 34 may be formed with ratchet teeth engaged by a pawl 60, riveted to or otherwise carried by a doubled leaf spring 62 urging it backwardly, and guided between lugs 64 on portions 46 of member 44. A leaf spring 66 urges the pawl against the teeth of flange 40.

Since part 46 moves with the friction means when the brake is applied, it carries pawl 60 sidewise at the same time. In at least one direction of movement, means is provided to operate the pawl when it is permitted, by excessive wear of the brake, to move more than a predetermined distance. This means is illustrated as a fixed inclined member or wedge 68 spot-welded or otherwise secured to the backing plate, and engaging the end of pawl 60.

In operation, the rocking of cams 22 serves to spread the shoes 16 and 18 apart to apply the brake, the braking torque being taken by the plates 26 from one or the other of the spindles 24. In the case in which the drum is turning counter-clockwise in Figure 1, with the vehicle moving forward, if the lining has worn unduly the pawl 60 will be operated to turn the adjusting device 40 to compensate for the wear. When the brake is released, the spindles 24 engaging the plate 26, together with the spreader 58, serve to center the shoes in released position with respect to the drum.

While one illustrative embodiment has been described in detail, it is not my intention to limit the scope of the invention to that particular embodiment, or otherwise than by the terms of the appended claims.

I claim:

1. A brake shoe having a thrust member threaded in one end, and means including a part with respect to which the shoe moves when the brake is applied and which means is operated by such relative movement for automatically turning said member to increase the effective length of the shoe to compensate for wear.

2. A brake comprising, in combination, friction means including shoes arranged end to end and a movable adjustable connection between the shoes, an adjustment-operating device including a part not moving with the shoes and acting on said connection to adjust it to compensate for wear when said shoes move more than a normal amount during the application and release of the brake.

3. A brake comprising, in combination, shoes arranged end to end, a connection between said shoes, and a stationary part having a device actuated by movement of the shoes for automatically adjusting the effective length of the connection to compensate for wear of the shoes.

4. A brake comprising, in combination, shoes arranged end to end, a connection having threaded engagement with said shoes, and means mounted separately from the shoes for turning said connection to adjust it to compensate for wear of the shoes.

5. A brake comprising, in combination, a pair of shoes, a corresponding pair of thrust members for said shoes, a device for adjusting both thrust members to compensate for wear of the shoes, and means operated by excessive movement of the shoes to actuate said device.

6. A brake comprising, in combination, a pair of shoes, a backing plate, a corresponding pair of thrust members having threaded engagement with said shoes, and a device mounted on the backing plate and arranged to turn both thrust members to compensate for wear of the shoes.

7. A brake comprising, in combination, a drum, a friction device anchoring at one end when the drum is turning in one direction and at the other end when the drum is turning in the other direction, and means for automatically increasing the effective length of said friction device to compensate for wear, said means including an adjustment for the friction device and an adjustment-operating part mounted separately from and operated by excessive movement of the friction device.

8. A brake comprising, in combination, a drum, stationary torque-taking means, a friction device anchoring at one end on said means when the drum is turning in one direction and at the other end on said means when the drum is turning in the other direction, means for increasing the effective length of said friction device to compensate for wear and preserve the initial clearance of the friction device with respect to the drum without adjustment of the torque-taking means, and a device mounted separately from said friction device and actuated by excessive movement thereof due to wear to operate said means to compensate automatically for said wear.

9. A brake comprising, in combination, a drum, connected shoes engageable with the drum and anchoring on one shoe when the drum is turning in one direction and on a different shoe when the drum is turning in the opposite direction, a backing plate, means for increasing the total effective length of the connected shoes to compensate for wear, and a device mounted on said backing plate and acting on said means in case of excessive applying movement of the shoes.

10. A brake comprising, in combination, a drum, shoes engageable with the drum and having an adjustable connection and anchoring on one shoe when the drum is turning in one direction and on a different shoe when the drum is turning in the opposite direction, and an adjusting device including a part engaging the connection and another part acting through the first part to adjust the connection when the shoes are worn.

11. A brake comprising, in combination, a pair of shoes, a device having right-and-left threaded engagement with the shoes, and means mounted separately from the shoes for turning said device to spread the shoes apart to compensate for wear.

12. A brake comprising, in combination, a pair of shoes, an adjustable floating connection between the shoes, and means having a movement independent of that of the shoes and of the connection for automatically adjusting said connection to spread the shoes apart to compensate for wear.

13. A brake comprising, in combination, a drum, shoes engageable with the drum, and means connecting the shoes including a device for yieldingly centering the shoes when the brake is released and also including an adjustment automatically operated to compensate for wear of the shoes.

14. A brake comprising, in combination, a drum, floating shoes engageable with the drum, and floating means connecting the shoes including a device for yieldingly centering the shoes when the brake is released and also including an adjustment automatically operated to compensate for wear of the shoes.

15. A brake comprising, in combination, floating shoes, a floating adjustable device connecting the shoes, a stationary member adjacent the adjustable device, and means automatically operated by engagement with the stationary member for adjusting said device to take up for wear of the shoes.

16. A brake comprising, in combination, floating shoes, a floating adjustable device connecting the shoes, shoe-centering means acting on the adjustable device, and means automatically operated concurrently with movement of the centering means for adjusting said device to take up for wear of the shoes.

17. A brake comprising, in combination, friction means, centering means yieldingly determining the released position of the friction means, and means automatically operated concurrently with the operation of said centering means to adjust the brake to compensate for wear.

18. A brake comprising, in combination, a backing plate, shoes arranged end to end adjacent said plate, means connecting said shoes and adjustable about an axis paralleling said plate to spread the shoes apart to compensate for wear, and a centering device acting on said means to determine the released positions of said shoes.

19. A brake comprising, in combination, a backing plate, shoes arranged end to end adjacent said plate, means movable with and connecting said shoes and adjustable about an axis paralleling said plate to spread the shoes apart to compensate for wear, and yielding means acting on said connecting means and resisting movement of the shoes.

20. A brake comprising, in combination, a backing plate, shoes arranged end to end adjacent said plate, means connecting said shoes and adjustable about an axis paralleling said plate to spread the shoes apart to compensate for wear, and spring-and-wedge means resisting movement of said connecting means with the shoes.

21. A brake comprising, in combination, a backing plate, shoes arranged end to end adjacent said plate, means connecting said shoes and adjustable about an axis paralleling said plate to spread the shoes apart to compensate for wear, centering members having cooperating wedge recesses and one of which moves with the shoes, an antifriction member in said recesses, and a spring compressed by relative movement of the centering members.

22. A brake comprising, in combination, a backing plate, shoes arranged end to end adjacent said plate, a connecting device moving with the shoes and having threaded engagement with the shoes to spread them apart to compensate for wear, and a centering device acting on said connecting device.

23. A centering device including a pair of parallel members having registering recesses, in combination with a member in said recesses adapted to force said members apart when one of them is moved lengthwise with respect to the other, and means yieldingly resisting movement of said members apart.

24. A centering device including a pair of parallel members having between their ends registering recesses, in combination with a member in said recesses adapted to force said members apart when one of them is moved lengthwise with respect to the other, and a pair of springs adjacent opposite ends of said members resisting movement of said members apart.

25. A coupling device for brake shoes comprising threaded thrust members arranged in combination with an Oldham coupling inter-engaging with the adjacent ends of said members.

26. A coupling device for brake shoes comprising threaded thrust members arranged in combination with an Oldham coupling inter-engaging with the adjacent ends of said members, together with means for relieving said coupling from thrust.

27. A coupling device for brake shoes comprising thrust members arranged end to end, an Oldham coupling inter-engaging with the adjacent ends of said members, and a rounded device surrounding said coupling and engaged by said members.

28. A coupling device for brake shoes comprising thrust members arranged end to end, coupling means between the adjacent ends of said members, and a rounded device surrounding said means and engaged by said members.

29. A coupling device including a coupling device and a thrust-transmitting device one inside of the other, in combination with centering means acting on one of said devices.

30. A brake including shoes arranged end to end, in combination with a rounded thrust-transmitting member between adjacent ends of said shoes having laterally-extending portions at the side of the shoes, in combination with centering means acting yieldingly on said portions.

31. A brake including shoes arranged end to end, in combination with a rounded thrust-transmitting member between adjacent ends of said shoes having laterally-extending portions at the side of the shoes, in combination with means acting yieldingly on said portions and resisting movement of the shoes.

32. An automatic adjusting device including a spring, a pawl carried by the spring, and a stationary member engaged by the pawl and operating it against the resistance of the spring.

33. An automatic adjusting device including a leaf spring, a pawl carried by the leaf spring, and means for operating the pawl against the resistance of the spring.

34. An automatic adjusting device including two rotatable thrust members, in combination with an adjusting device acting automatically on one of said members and a coupling through which said one member adjusts the other member.

35. A brake adjusting device including two rotatable thrust members, in combination with adjusting means acting on one of said members and a coupling through which said one member adjusts the other member.

36. Brake centering means including spaced springs, in combination with members spread apart by the application of the brake to compress said springs.

37. Brake centering means including spaced springs, in combination with means operated by the application of the brake to compress said springs.

38. Brake centering means comprising yieldingly-held members having registering recesses, in combination with a spreading device arranged in said recesses.

39. A brake comprising, in combination, a pair of shoes, and a device actuated by excessive movement of the shoes and having relative movement with respect to the shoes to increase automatically the effective length of each shoe to compensate for wear causing such excessive movement.

40. A brake comprising, in combination, a drum, a backing plate, friction means within the drum, an automatic adjusting means including a part carried by the backing plate and with respect to which the friction means moves and a second part carried by the friction means and operated by the first part to increase the effective length of the friction means to compensate for wear.

41. A brake comprising, in combination, a drum, friction means engageable with the drum, and automatic adjusting means including a part mounted separately from the friction means and with respect to which the friction means moves and a second part carried by the friction means and operated by the first part to increase the effective length of the friction means to compensate for wear.

In testimony whereof, I have hereunto signed my name.

LUDGER E. LA BRIE.